United States Patent [19]

Rousseau

[11] Patent Number: 4,955,941
[45] Date of Patent: Sep. 11, 1990

[54] SUPPORT TABLE FOR BENCH SAW

[76] Inventor: Tony Rousseau, 1712 - 13th St., Clarkston, Wash. 99403

[21] Appl. No.: 299,622

[22] Filed: Jan. 23, 1989

[51] Int. Cl.⁵ .............................................. A47B 1/00
[52] U.S. Cl. ..................................... 108/65; 269/901
[58] Field of Search ....................... 108/65, 60, 61, 62, 108/69, 90, 50, 153; 269/319, 901; 144/286 R, 286 A; 83/477.2; 298/240.4

[56] References Cited

U.S. PATENT DOCUMENTS

| | | | |
|---|---|---|---|
| 2,596,663 | 5/1952 | Duffy | 108/69 |
| 2,622,353 | 12/1952 | Mendelson | 108/130 X |
| 4,068,551 | 1/1978 | Kreitz | 144/286 R X |
| 4,733,704 | 3/1988 | Wolff | 108/62 X |
| 4,757,849 | 7/1988 | Morris | 108/97 X |

FOREIGN PATENT DOCUMENTS 1471195  3/1967  France ................................. 108/65

Primary Examiner—Jose V. Chen
Attorney, Agent, or Firm—Keith S. Bergman

[57] ABSTRACT

A foldable table structure to releasably support the peripheral undersurface of the table portion of a commercial powered bench saw to provide support for and additional tabletop space about the bench saw table. The table provides an opposed rail ladder type frame to support the undersurface of the table of a bench saw table and surface forming elements to allow various modular arrays of these elements. The principal table releasably carries a lateral extension element and releasably supports an auxiliary table that is selectively positionable either perpendicularly or in an elongate orientation relative to the principal table. The modular design of the saw mounting structure allows its use with most bench saws of modern commerce. The principal table provides an adjustably positionable fence structure and allows use of the traditional amenities of ordinary table saws.

4 Claims, 3 Drawing Sheets

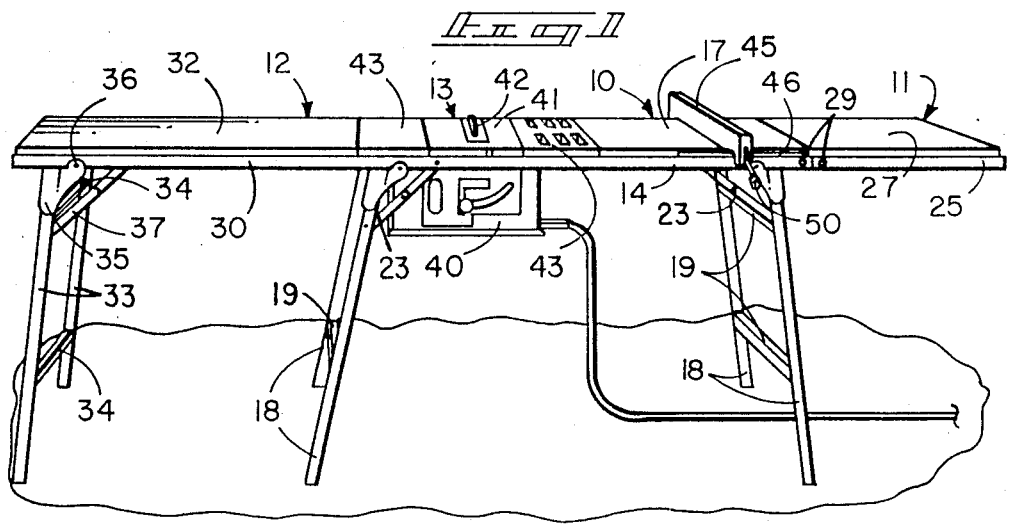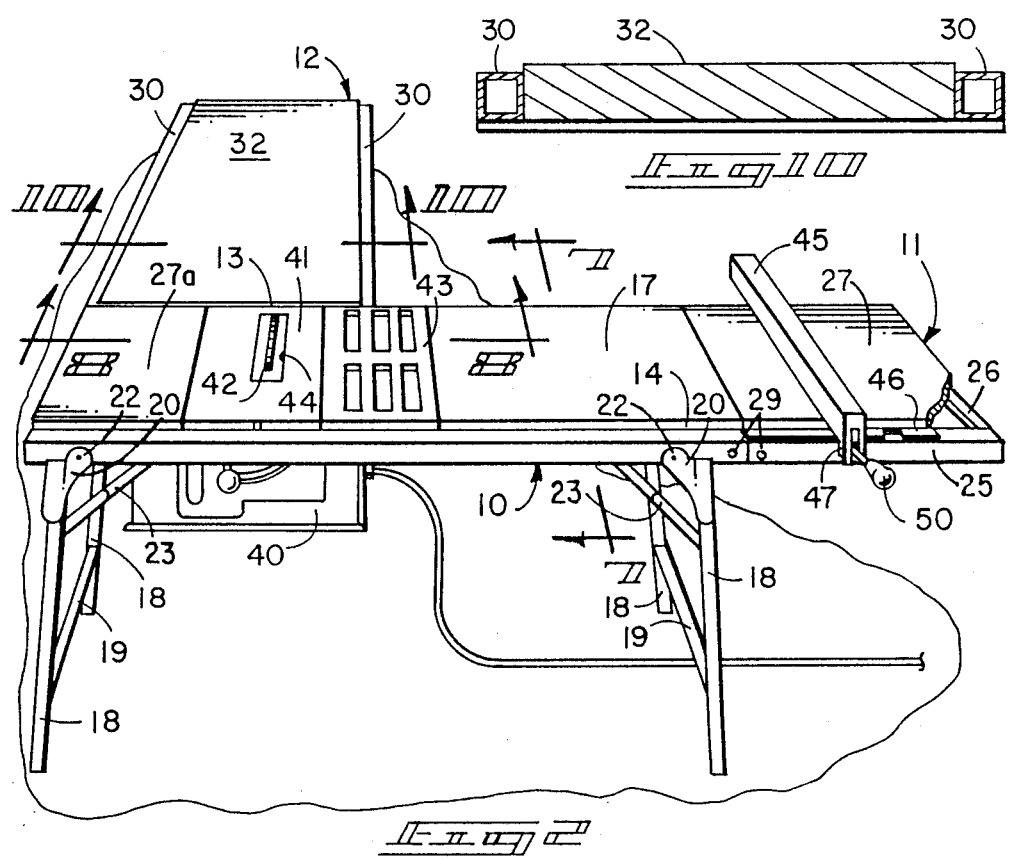

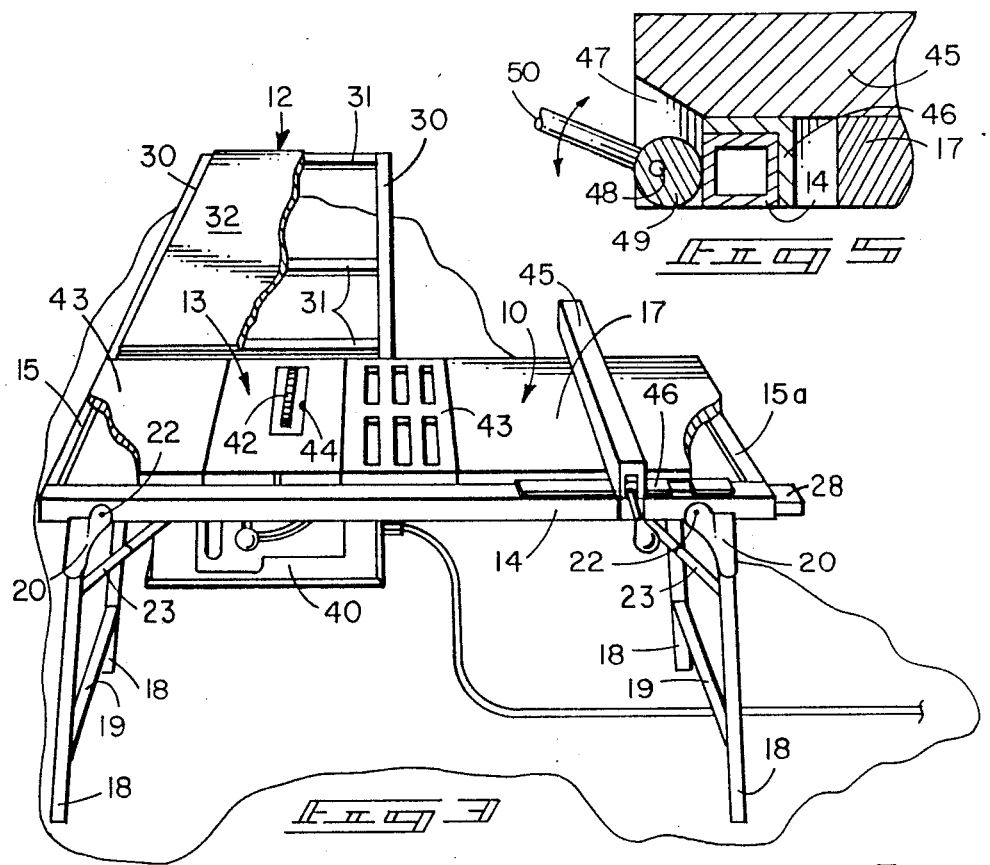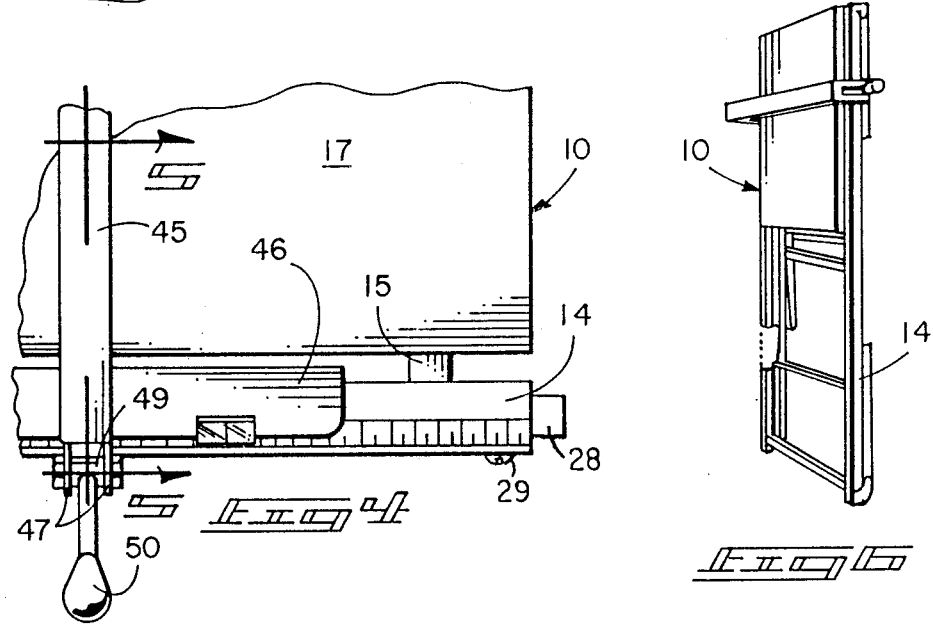

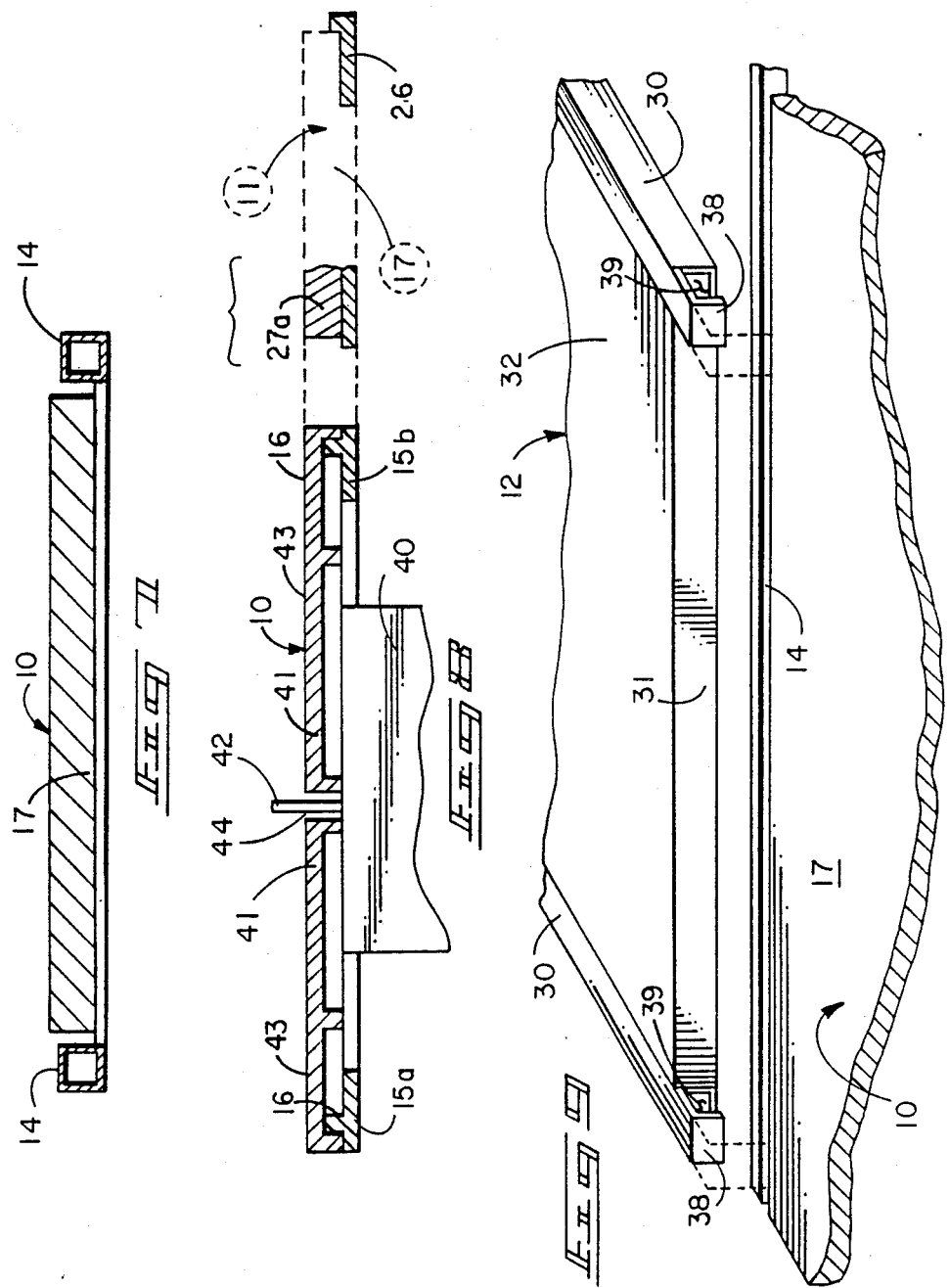

SUPPORT TABLE FOR BENCH SAW

BACKGROUND OF INVENTION

A. Related Applications

There are no applications related hereto heretofore filed in this or any foreign country.

Field of Invention

My invention relates generally to table for powered saws, and more particularly to such a table that supports a bench saw and provides additional work surface thereabout.

C. Background and Description of Prior Art

Mechanically powered saws of the present day may generally be divided into a first class of hand manipulatable saws providing no associated independently supported table-like structure thereabout and a second class of so-called "table saws" providing a planar table of some areal extent about the saw element to independently support it and also a workpiece being operated upon. This second category of table saws has itself in recent commerce devolved into two separate subgroups, the first embodying larger "table saws" generally of at least ten inch diameter that are supported in a table structure that is supported on a floor element, generally at a working height of about thirty to thirty-four inches thereabove, and the second subgroup embodying so-called "bench saws" that provide a generally smaller table structure supporting a saw commonly of eight to eight and one-half inch diameter at a distance of a few inches above a planar supporting surface for use generally upon an existing work bench that provides a planar support at generally about twenty-four to thirty-six inches above a surrounding floor.

My invention provides an auxiliary table to independently support a bench saw upon a floor at a working height of approximately thirty-four inches thereabove with an auxiliary table structure at the same height as the upper surface of the existing bench saw table.

In so doing, my invention allows the use of the more economical bench saw, but yet provides the amenities of independent floor support and larger and extensive work surface commonly traditionally provided only by the substantially more expensive table saws of the present day. In providing such an auxiliary table, it is preferable to maintain the top of the bench saw table in substantially coplanar relationship with the associated auxiliary table for efficiency and convenience of use. It is also desirable that the auxiliary supporting table structure be configured to accept a substantial number of the variously configured bench saws of modern day commerce to increase utility and merchantability of the auxiliary table and accentuate its economic potential.

To meet these amenities and allow support of a bench saw in my auxiliary structure, with the bench saw table and the auxiliary table substantially coplanar, the only features that are common to all commercial bench saws is a flat base upon which they are supported. Since such saws differ in dimension and configuration, it is not practical to use this flat base as a means to mount these saws in an auxiliary table structure and yet maintain such a table that will accept a plurality of commercially available bench saws. One feature of most bench saws that is reasonably similar is the shape of the table and its configuration in providing a peripheral portion that protrudes generally beyond the internal structures of the saw and its base to provide a peripheral table lip with an unencumbered undersurface completely about the table. Mechanically such tables are also necessarily, by reason of their use, structurally interconnected to the rest of the saw structure and generally of substantially uniform thickness to further aid this mounting method. These features collectively allow the support of a bench saw table by supporting an under portion of its peripheral lip. The instant invention uses this feature to allow mounting and support a variety of commercial bench saws in a single support structure.

In using table saws, it is oftentimes convenient, if not necessary, that an associated table extend for substantial distances about the saw blade to accomplish particular sawing functions. Commonly this requirement has been accommodated in the traditional floor supported-type table saw by providing extension elements that are mechanically fastened by bolting or otherwise to the table structure itself and are removable and interchangeable to variously configure the saw table for particular purposes. Most commonly, such extensions are usable only in a lateral direction, that is perpendicular to the principal plane of a saw blade. My instant invention resolves this table configuration problem in a different and more convenient fashion by providing not only a traditional table extension element, but also a releasably positionable auxiliary table that is supported at one end by legs and at the other end by the principal auxiliary table. This auxiliary table may be positioned on either lateral side of the peripheral table adjacent a saw blade, with or without use of extensions, or on either edge of the table in front of or behind a saw blade. This structure provides a substantially larger table area and provides a particular fastening method that allows fastening, removal and replacement much more readily than the traditional mechanically interconnected table saw extensions.

My table is formed with opposed peripheral rails and a modular construction so that top elements are supported within the peripheries defining particular modules and the table of a bench saw may be supported within one of those modules. This construction provides both economy and ease of manufacturing, but more importantly allows acceptance of different bench saw tables and auxiliary tabletop modules at various positions. Similarly, the particular modular design allows supported elements to be positionally maintained in an unfastened condition, but yet allows them to be either releasably or permanently mechanically fastened within the support structure, if desired. The particular structure also provides the traditional amenities of a table saw table, and particularly adjustable fences, support structures to aid the motion of material relative to a saw blade and saw blade guards and covers.

My invention resides not in any one these features per se, but rather in the synergistic combination of all of the structures of my invention that give rise to the functions necessarily flowing therefrom.

SUMMARY OF INVENTION

My invention generally provides a modular table structure having opposed peripheral rails with foldably interconnected legs for table support at a working height above a supporting surface. The table structure defines an orifice void wherein the top of a bench saw may be supported by contact with the lower peripheral surface of its table. A plurality of modules releasably support table forming elements at a height substantially coplanar with the bench saw table. My table structure provides modules to support a bench saw table at two opposed sides to allow supportative association with various bench saw tables of present commerce. My table is provided with a releasably positionable lateral extension element.

An auxiliary support table provides opposed peripheral rails, foldably interconnecting legs at one end to support its table top at a height coplanar with the principal table, and releasable fastening structure at the other end to support that end in various positions about the periphery of the principal table, either perpendicular or parallel to the longer dimension of that principal table.

In creating such a device, it is:

A principal object of my invention to provide a modular principal table to support a bench saw at working height above a surface with auxiliary table structure laterally of both sides of a supported bench saw table.

A further object of my invention to provide such a principal table that has an associated auxiliary table that may be releasably attached adjacent either lateral side or either elongate side of the principal table to provide additional table area, coplanar with the principal table, in varying positions.

A further object of my invention to provide such a table structure that is of modular design to releasably support the lower portion of the periphery of two opposed sides of a bench saw table so as to allow use with various bench saw tables of present commerce.

A further object of my invention to provide such a principal table that releasably attaches modular table elements and has plural folding legs to allow the structure to be collapsed into a relatively small volume for storage and transportation.

A still further object of my invention to provide such a table structure that has an auxiliary table with particular fastening means to allow releasable attachment to extend perpendicular to either side rail or parallel to either end of the principal table structure.

A still further object of my invention to provide such a table structure that is of new and novel design, of rugged and durable nature, of simple and economic manufacture and otherwise well suited to the uses and purposes for which it is intended.

Other and further objects of my invention will appear from the following specification and accompanying drawings which form a part hereof. In carrying out the objects of my invention, however, it is to be understood that its essential features are susceptible of change in design and structural arrangement with only one preferred and practical embodiment being illustrated in the accompanying drawings as is required.

BRIEF DESCRIPTION OF DRAWINGS

In the accompanying drawings which form a part hereof and wherein like numbers of reference refer to similar parts throughout:

FIG. 1 is a perspective view of the principal support table of my invention, showing its parts, their configuration and relationship with the auxiliary table extending laterally therefrom.

FIG. 2 is a similar perspective illustration of the structure of FIG. 1, but arranged with the auxiliary table extending perpendicularly to the principal support table.

FIG. 3 is a perspective illustration of the frame structure of both primary and auxiliary tables arranged as in FIG. 2 but with the table elements partially cut-away.

FIG. 4 is a somewhat enlarged orthograpic top view of the side rail of the frame showing particularly the interfitting of the movable frame structure therewith.

FIG. 5 is a cross-sectional view of the fence locking structure and adjacent frame rail of FIG. 4, taken on the line 5—5 in the direction indicated by the arrows.

FIG. 6 is an isometric view, somewhat reduced, of my table structure in its collapsed mode for storage or transportation.

FIG. 7 is an elongate vertical cross-sectional view through the table structure of FIG. 2, taken on the lines 7—7 thereon in the direction indicated by the arrows.

FIG. 8 is a transverse vertical cross-sectional view through the table of FIG. 2, taken on the line 8—8 thereon in the direction indicated by the arrows.

FIG. 9 is an expanded partial isometric view of the end structure of the auxiliary table showing the fastening means which join it at either a side edge or lateral end of the principal table.

FIG. 10 is an elongate cross-sectional view through the ancillary table of FIG. 2, taken on the line 10—10 thereon in the direction indicated by the arrows.

DESCRIPTION OF THE PREFERRED EMBODIMENT

My invention generally provides saw table 10 releasably supporting lateral extension 11 and auxiliary table structure 12 to provide a support for and an additional table about bench saw 13.

Saw table 10 is formed with parallel spaced rails 14 structurally interconnected by plural perpendicular cross supports 15 including at least two end cross supports 15a interconnected at each end of rails 14 and one medial cross support 15b interconnected at a medial position at the inner end of the table of a bench saw to be supported. The upper surfaces of rails 14 is spacedly below the upper surface of cross supports 15, commonly by approximately the thickness of the a fence guide piece to be supported by a rail 14. The distance between the opposed inner surfaces of rails 14 is substantially the same as the elongate dimension of the table of a bench saw to be supported.

The dimensioning and configuration of the top structure of table 10 is somewhat critical to my invention. The distance between the inner facing surfaces of rails 14 should be at least, and preferably substantially equal to, the elongate dimension of the table of a bench saw to be supported and the distance between one end cross support 15a, commonly the left end cross support, and medial cross support 15b should be such that the two cross supports fit immediately inwardly adjacent the lateral peripheral edges of the table of a bench saw to be supported, either with or without extension elements as the case may be. Rails 14 preferably take the shape of box beams defining internal channels and cross supports 15 are rectilinear beams, as illustrated, though undoubtedly other rigid elements of differing cross-sectional configuration might serve the purposes of my invention so long as they meet its essential requirements. An upwardly extending lip 16 may be provided on cross supports 15 to fit, generally inwardly adjacent, the lateral edges of a bench saw table and removable table elements to be supported to prevent lateral motion of these elements relative to the frame of the table structure.

The principal table frame structure releasably supports at least one table top element 17 of some areal extent. This table element preferably has a thickness substantially the same as that of a bench saw table to be supported (commonly 1.375 inches), with an elongate dimension to extend substantially between the adjacent surfaces of rails 14 and a lateral dimension to extend between right end cross support 15a and medial cross support 15b. This element is formed of some rigid durable material of relatively low mass, such as plywood, particle board or plastic, though other rigid materials fulfilling the specified requirements will serve the purposes of the element.

The principal table structure is supported at each end by sets of paired spaced legs 18 structurally interconnected in parallel relationship by leg cross elements 19. The spacing between legs 18 is the same as that between side rails 14. The upper portion of each leg carries a bell crank shaped hinge having spaced bell crank elements 20 fastened on either side of the upper portion of the support legs 18, preferably with a web structurally communicating therebetween. The leg 18 is pivotally mounted by pins 22 extending between the two bell crank side elements and through the lateral end portions of rails 14. Each leg 18 in its upper portion carries angularly inwardly extending compound support 23 which is pivotally interconnected in its medial portion and pivotally mounted in its lower end on the upper portion of the support leg and in its upper end on the adjacent rail to pivot to allow leg motion but provide catching mechanism to maintain erected leg position. Both this hinge structure and folding support element are well known in the existing foldable leg table arts and therefore are not specified in detail. The elements are not a part of my invention, per se, but are necessary for its operability.

The legs illustrated are channel beam elements all of similar length, to mount the peripheral saw table structure on a planar supporting surface at a spaced distance thereabove and in an orientation parallel thereto. The length of the legs is such as to maintain the table surface at a comfortable and traditional work height of approximately thirty-four inches above a supporting surface. Preferably the length of the table, in a lateral direction, is approximately forty-eight inches and its width is approximately eighteen inches to accommodate commonly sized bench saws of modern day commerce.

Extension 11 provides a flat rectilinear structure of width the same as that of the principal table and of similar structure with extension rails 25 structurally interconnected by cross supports 26. The extension carries table top element 27 which extends laterally between cross elements for support and in an elongate direction between the rails 25 for positional maintenance, as illustrated. The extension is a rigid structure and of the same thickness as table element 17 to provide an extension that may be positioned coextensively with the principal table.

Rails 25 of the extension are of similar cross-sectional shape and spacing to rails 14 of the principal table so that both sets of rails may be joined in end to end relationship by fasteners 28 extending between the channels of each adjacent end portion of the table and extension. These fasteners may be positionally maintained by friction or, if desired, by set screws 29 threadedly carried by each rail to extend within the channel defined by that rail to there forcefully contact the adjacent fastener. Fasteners 28 may be releasably positioned in both the extension rails and table rails or, if desired, may be fixedly positioned in one or the other of the rails, but in either event, the fasteners may releasably fasten the extension at either lateral end of the principal table to provide an additional supportative surface extending beyond the lateralmost extent of the principal table.

Auxiliary table 12 provides a top structure, again similar to the top structure of principal table 10. The auxiliary table structure is formed by parallel spaced rails 30 structurally interconnected by cross elements 31 preferably to maintain the auxiliary table rails at the same spaced distance as those of the principal table. The structure of the auxiliary table provides the uppermost portions of cross pieces 31 spacedly below the uppermost portions of rails 30. A table top structure 32 is maintained on the upper surfaces of the cross pieces and between rails 30. This top member is of the same thickness as the top member of the principal table so that when the auxiliary table is used therewith, its upper surface may be coplanar with both that of the principal table and extension 11. Obviously other similar table structures may be usable with my invention so long as they fulfill the essential features specified.

The auxiliary table at one end is provided with paired spaced legs 33 interconnected by leg cross elements 34, again formed in the same configuration and fashion as the leg structures of the principal table. The upper portions of legs 33 carry structurally interconnected hinges 35 which are pivotally mounted to one end portion of the side rails by pins 36 extending therebetween, again in the same fashion as the hingeable mounting of the legs on the principal table. Compound fastening and support arms 37 extend angularly inwardly from the legs to the adjacent rail to provide support for the legs, but yet allow their pivotal motion and releasable fastening in a supportive position. This leg structure is carried by the auxiliary table immediately inwardly adjacent one of its end portions. The legs are so dimensioned and configured as to support the auxiliary table at the same height as the principal table.

The end of the auxiliary table opposite its support leg structure is provided with fastening brackets 38 to releasably fasten that end portion of the auxiliary table to a rail 14 of the principal table when the auxiliary table be positioned perpendicularly to the principal table. Brackets 38 define a downwardly spacing channel portion 39 immediately outwardly adjacent the end of table element 32 to fit over rails 14 and thusly releasably maintain the bracket end of the auxiliary table relative to the principal table when positioned perpendicular to the side rails. If it be desired to position the auxiliary table parallel to either end of the principal table, brackets 38 are defined to be received in channels defined by the end portions of rails 14 to releasably support the bracketed end portion of an auxiliary table in this position.

The length of auxiliary table 12 is preferably approximately forthy-eight inches. The width of the auxiliary table is necessarily limited by the width of the principal table with the particular fasteners described. These dimensions are not critical to my invention, however, and may be varied according to the exigencies of a particular situation.

A work guide structure comprising elongate fence 45 is provided for convenient use with my table to aid in guiding work pieces over and along its upper table surface. The fence is of a length preferably at least as long as the elongate dimension of the table, perpendicular to rails 14 and carries a releasable fastening structure at one end for positional maintenance. In the instance illustrated, the fastening structure provides perpendicular guide piece 46 of "L" shaped cross-sectional configuration fastened to the undersurface of the fence in a position to fit with one leg above forward rail 14 and the other leg inwardly adjacent the inner surface of that rail, as illustrated particularly in FIG. 2. The end portion of the fence adjacent the guide piece provides a depending yoke 47 which pivotally mounts pin 48 carrying eccentrically mounted cylinder 49 which may be pivotally moved about its mounting pin 48 by normally extending handle 50 to frictionally engage the outer surface of rail 14 to releasably positionally maintain the fence structure relative to the forward rail. This type of fence structure is common in the saw table arts, is not new per se, and constitutes no direct part of my invention but only one of its necessary associative elements.

Having thusly described the structure of my invention, its use, function and operations may be understood.

A typicl bench saw 13 to be supported by my table structure is shown in supportive position in FIGS. 1 and 2 of the drawings. Such a bench saw traditionally provides base structure 40 supporting principal bench saw table 41 in its upper portion with saw structure 42 projecting upwardly through appropriate orifices in the middle portion of the table. Such bench saws may be provided with one or more auxiliary lateral table extensions 43 that are releasably fastened to the lateral portions of one or both sides of principal table 41 by bolting or other mechanical means. This structure is such as to provide a bench saw table of some areal extent that has a peripheral lip extending outwardly from the upper portion of base structure 40 so that the entire bench saw unit may be supported by supporting the undersurface of the saw table about its periphery. Commonly, the size, configuration and thickness of principal bench saw tables and extensions are similar, apparent to allow comparative merchandising. The table dimensions commonly are approximately eighteen inches in an elongate direction and twenty-six inches in a lateral direction without extension elements. Each extension elements commonly are approximately nine inches in lateral extension and eighteen inches in elongate extension. By reason of this dimension, a support table may be configured to support a plurality of presently existing bench saws of commerce in the fashion in which they are supported by my invention.

To use my invention with such a bench saw, the principal support table of my invention is assembled, its legs extended in supportive fashion and the table structure positioned on some supportive surface, such as a floor. The auxiliary table extension is positioned relative to the principle table as desired. Bench saw 13 is then positioned in saw orifice 44 defined in the table top by lowering the base of the saw through that orifice by appropriate manual manipulation until the bench saw table is supported between supports defining orifice 44 and on cross elements 15a and 15b. Orifice 44 may be variously defined to accept a saw with or without lateral extensions fastened in the principal saw table. In the instance illustrated in FIGS. 1 and 2, lateral extensions are fastened to the bench saw table, though a saw without lateral extensions may be positioned in substantially the same fashion and table top voids covered by additional top elements 27a. Such bench saws commonly are of fairly substantial mass and may be positionally maintained by reason of their weight alone. Commonly, however, various mechanical fastening devices, such as bolts, screws, clips or other fasteners of like nature, may be used to releasably maintain the bench saw table in appropriate position in my support table.

It is to be noted with use of my support table, that when a bench saw is in operative and supportative position therein, either extension 11 or auxiliary table 12 may be positioned in any fashion relative to the principal table that they might be positioned in were the saw not in place.

It is further to be noted that cross supports 15 may be variously positioned relative to rails 14 to define saw orifice 44 in the principal table in various positions relative to that table and with varying dimensions. In fact, if desired, the cross supports might be releasably mechanically joined to rails 14 by nut-bolt combinations or otherwise to allow adjustable positioning of these elements relative to each other, though commonly for ease of construction and operation, I prefer to permanently joinder these elements in one particular configuration.

The various table elements also may be positionally maintained by reason of the cellular support structure surrounding their periphery without additional mechanical fastening, if desired. The table elements preferably are mechanically fastened by ordinary fasteners such as bolts, screws, rivets, or the like, extending between the support structure and the table elements, to join these structures either releasably or permanently. The preferred and generally most convenient method of such joinder is by use of screws extending from the undersurface of the support structure through appropriate holes therein and into threaded engagement with the undersurface of the table elements. The method of mechanical joinder, however, is not essential to my invention and various known and used methods for such purposes may be used. Preferably, however, any joinder will be of such nature as to provide no portions of fastening elements projecting above the upper surface of the tabletop elements so that the fasteners might interfere with work being moved across the support table.

The foregoing description of my invention is necessarily of a detailed nature so that a specific embodiment of it might be set forth as required, but it is to be understood that various modifications of detail, rearrangement and multiplication of parts might be restored to without departing from its spirit, essence or scope.

Having thusly described my invention, what I desire to protect by Letters Patent, and what I claim is:

1. A foldably collapsible table, having a top structure to support a bench saw having a bench saw blade, said bench saw table being rectilinear said bench saw having an undersurface inwardly adjacent two opposed side edges for support within an orifice defined in the table top structure and said bench saw being supported at a spaced distance above a surface supporting said table, comprising, in combination:

a table frame structure having similar elongate spaced coplanar rails with upper and lower surfaces,
said rails being structurally joined in parallel relationship by at least three cross supports interconnected with the lower surfaces of the rails, with end cross supports substantially at each opposed end of the rails and at least one medial cross support,
said rails extending a spaced distance above the cross supports and being spaced apart to receive therebetween said bench saw table to be supported in the table frame structure and one of said end cross supports and an adjacent medial cross support positioned to support the undersurface of opposed side edges of said bench saw table to be supported in the table frame structure;

a table top element, supported in the table frame structure between the rails and on cross supports to form a table top element over the portion of the table frame structure not occupied by said bench saw table said bench saw table; and opposed sets of pairs of similar legs spaced to communicate with each rail, one leg set pivotally carried substantially at each end of the spaced rails for folding motion relative to the rails and each said leg set having releasable means for maintaining a supportive mode.

2. The apparatus of claim 1 further characterized by:

fastening means carried by and extending from adjacent ends of said rails of said table frame structure to releasably interconnect opposed rails of an extension table, and a releasably positionable extension table, having similar elongate coplanar extension table rails with upper and lower surfaces and being similarly spaced as the rails of the table frame structure to communicate therewith, said extension table rails being interconnected by at least two spaced cross supports interconnecting the lower surfaces of the rails of the table frame structure and a top element carried on the cross supports and between the extension table rails, said extension table being releasably interconnected by the fastening means carried by the rails of the table frame structure with the extension table top in a substantially coplanar relationship with the table.

3. The apparatus of claim 1 further including an auxiliary table structure comprising:

paired opposed auxiliary table side rails structurally interconnected at least in their end parts by two spaced cross supports;

a set of paired legs having at least one cross support structurally communicating between each leg of a set and each said leg being pivotally interconnected in its upper portion to adjacent end portions of the paired opposed auxiliary table side rails, said leg set having releasable means to maintain a supportive mode depending from the auxiliary table side rails; and two brackets carried by the auxiliary table side rails at the ends opposite the leg set, each bracket having an "L" shape and extending a spaced distance from the side rail carrying it to define a downwardly opening to extend over and capture a side rail of the table for releasable support of the bracket defining end of the extension table.

4. The apparatus of claim 3 further characterized by:

the paired opposed side rails of the auxiliary table being spaced similarly to the spaced rails of the table frame structure of the table so as to be coextensive therewith, the table frame structure rails is at least one end each defining channels for a spaced distance inwardly from their ends; and the brackets carried by the side rails of the auxiliary table being configured to extend into the channels defined by the top frame rails to releasably fasten the auxiliary table in end to end relationship to the table.

* * * * *